(12) United States Patent
Hattori et al.

(10) Patent No.: US 9,633,791 B2
(45) Date of Patent: Apr. 25, 2017

(54) MONOLITHIC CAPACITOR

(71) Applicant: Murata Manufacturing Co., Ltd., Nagaokakyo-shi, Kyoto-fu (JP)

(72) Inventors: Kazuo Hattori, Nagaokakyo (JP); Isamu Fujimoto, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 131 days.

(21) Appl. No.: 14/205,769

(22) Filed: Mar. 12, 2014

(65) Prior Publication Data
US 2014/0268488 A1 Sep. 18, 2014

(30) Foreign Application Priority Data

Mar. 15, 2013 (JP) .................................. 2013-054026
Dec. 26, 2013 (JP) .................................. 2013-268295

(51) Int. Cl.
*H01G 4/005* (2006.01)
*H01G 4/30* (2006.01)
(Continued)

(52) U.S. Cl.
CPC ............... *H01G 4/30* (2013.01); *H01G 4/005* (2013.01); *H01G 4/012* (2013.01); *H01G 4/232* (2013.01)

(58) Field of Classification Search
CPC ........... H01G 4/005; H01G 4/012; H01G 4/30
(Continued)

(56) References Cited

U.S. PATENT DOCUMENTS 4,661,884 A 4/1987 Seaman
6,304,425 B1 10/2001 Mamada
(Continued)

FOREIGN PATENT DOCUMENTS

JP 05074644 A * 3/1993
JP 11288839 A * 10/1999
(Continued)

OTHER PUBLICATIONS

Official Communication issued in corresponding Korean Patent Application No. 10-2014-0029598, mailed on Aug. 18, 2015.
(Continued)

*Primary Examiner* — Eric Thomas
(74) *Attorney, Agent, or Firm* — Keating & Bennett, LLP

(57) ABSTRACT

A monolithic capacitor includes a multilayer body including a plurality of stacked dielectric layers, first and second capacitor electrodes inside the multilayer body, and outer electrodes on at least one surface of the multilayer body. The first and second capacitor electrodes are arranged perpendicularly or substantially perpendicularly to first and second surfaces of the multilayer body. The first capacitor electrode includes a capacitor portion opposed to the second capacitor electrode with the dielectric layer interposed therebetween, a lead portion connected to one outer electrode, and an intermediate portion not opposed to the second outer electrode. The second capacitor electrode includes a capacitor portion opposed to the first capacitor electrode with the dielectric layer interposed therebetween, and a lead portion connected to the other outer electrode. The intermediate portion is arranged in a gap area that is surrounded, when viewed in a stacking direction of the dielectric layers, by imaginary lines extending from inner exposed ends of the lead portions in a direction interconnecting the first and
(Continued)

second surfaces of the multilayer body, by the capacitor portions, and by the first surface.

15 Claims, 8 Drawing Sheets

(51) Int. Cl.
*H01G 4/012* (2006.01)
*H01G 4/232* (2006.01)

(58) Field of Classification Search
USPC ..................................... 361/303, 301.4, 304
See application file for complete search history.

(56) References Cited

U.S. PATENT DOCUMENTS

| | | | |
|---|---|---|---|
| 6,381,117 B1 * | 4/2002 | Nakagawa | H01G 2/14 361/301.4 |
| 7,697,262 B2 † | 4/2010 | Ritter | |
| 8,947,850 B2 * | 2/2015 | Togashi | H01G 4/30 361/301.3 |
| 9,218,910 B2 * | 12/2015 | Kim | H01G 4/35 |
| 2011/0096464 A1 | 4/2011 | Togashi et al. | |
| 2013/0038979 A1 | 2/2013 | Togashi | |
| 2013/0050897 A1 * | 2/2013 | Kim | H01G 4/12 361/321.2 |

FOREIGN PATENT DOCUMENTS

| | | |
|---|---|---|
| JP | 2000-232030 A | 8/2000 |
| JP | 2004-140183 A | 5/2004 |
| JP | 2009-65198 A | 3/2009 |
| JP | 2011-91271 A | 5/2011 |
| JP | 2013-38332 A | 2/2013 |

OTHER PUBLICATIONS

Official Communication issued in corresponding Japanese Patent Application No. 2013-268295, mailed on Feb. 2, 2016.
Official Communication issued in corresponding Chinese Patent Application No. 2014100924809, mailed on Jun. 1, 2016.
Official Communication issued in corresponding Japanese Patent Application No. 2013-268295, mailed on Sep. 6, 2016.

* cited by examiner
† cited by third party

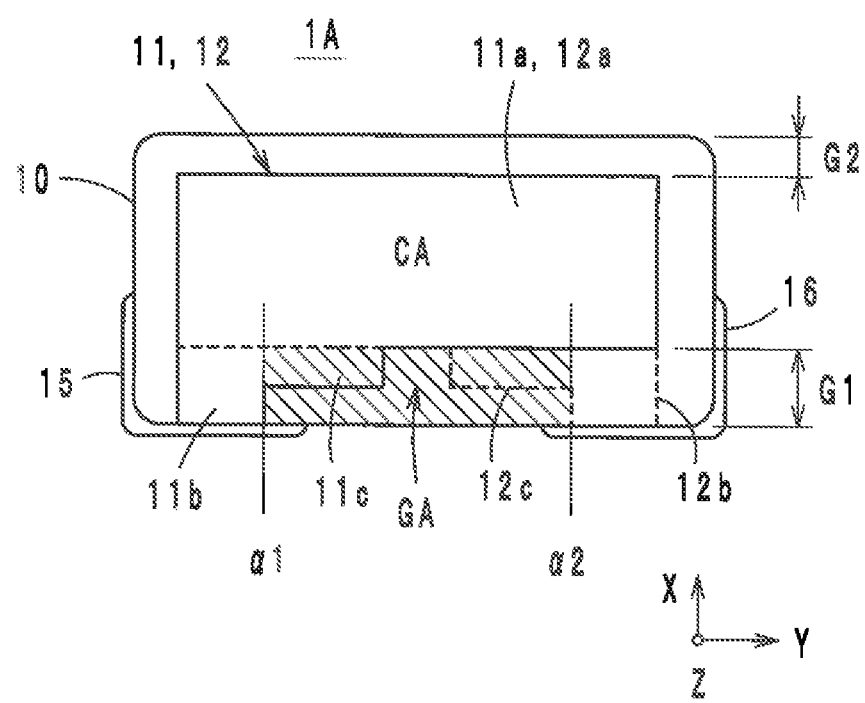

Example of Present Invention
11a, 12a

A

Example of Related Art
11a, 12a

A

MONOLITHIC CAPACITOR

BACKGROUND OF THE INVENTION

1. Field of the Invention

The present invention relates to a monolithic capacitor, and more particularly to a monolithic capacitor including a plurality of capacitor electrodes disposed in a multilayer body, which includes a plurality of dielectric layers stacked in opposing relation with the dielectric layers interposed between the capacitor electrodes, and outer electrodes disposed on at least one surface of the multilayer body and connected to the capacitor electrodes.

2. Description of the Related Art

In a monolithic capacitor in which capacitor electrodes and dielectric layers are stacked, an electrostrictive phenomenon occurs in a capacitor portion and a multilayer body expands and contracts in response to application of a voltage. Recently, with further reduction in size and thickness of the monolithic capacitor, an electric field applied to a dielectric has been increased and the electrostrictive phenomenon has become non-negligible. When an AC voltage including ripples or a DC voltage superimposed with an AC component is applied to the monolithic capacitor mounted (soldered) to a board (substrate), expansion and contraction of the multilayer body are transmitted to the board, whereby the board vibrates. When a frequency of the vibration falls within an audible range of 20 Hz to 20 kHz, the vibration is perceived as audible sounds by the human ear. Such a phenomenon is called "acoustic noise" and causes problems particularly in TVs, notebook personal computers, cellular phones, and so on.

Various proposals have been suggested so far to prevent or reduce the "acoustic noise". For instance, Japanese Unexamined Patent Application Publication No. 2000-232030 proposes a technique such that ceramic capacitors having equivalent specifications are arranged on front and rear surfaces of a circuit board in a surface-symmetric relationship. With the proposed technique, vibration transmitted to the circuit board from one capacitor and vibration transmitted to the circuit board from the other capacitor cancel each other. As a result, the occurrence of the audible sounds is reduced.

However, the preferred embodiment disclosed in Japanese Unexamined Patent Application Publication No. 2000-232030 has the problem that a degree of freedom in circuit design degrades due to the necessity of mounting two capacitors having equivalent specifications on the front and rear surfaces of the circuit board.

SUMMARY OF THE INVENTION

Preferred embodiments of the present invention provide a monolithic capacitor capable of significantly reducing or preventing audible sounds while ensuring a high degree of freedom in circuit design.

A monolithic capacitor according to a preferred embodiment of the present invention includes a multilayer body including a plurality of dielectric layers and having a rectangular or substantially rectangular parallelepiped shape with six surfaces, the six surfaces including a first surface as a mount surface, a second surface opposed to the first surface, a third surface and a fourth surface extending perpendicularly or substantially perpendicularly to the first surface and the second surface and perpendicularly or substantially perpendicularly to a stacking direction of the dielectric layers, and opposed to each other, and a fifth surface and a sixth surface extending perpendicularly or substantially perpendicularly to the first to fourth surfaces and opposed to each other, a plurality of first capacitor electrodes and second capacitor electrodes arranged inside the multilayer body, and a first outer electrode and a second outer electrode arranged on at least one surface of the multilayer body, wherein the first capacitor electrodes and the second capacitor electrodes are arranged perpendicularly or substantially perpendicularly to the first surface and the second surface, each of the first capacitor electrodes includes a capacitor portion opposed to the second capacitor electrode with the dielectric layer interposed therebetween, a lead portion led out from the capacitor portion to at least one surface of the multilayer body and connected to the first outer electrode, and an intermediate portion positioned between the capacitor portion and the lead portion and not opposed to the second outer electrode, each of the second capacitor electrodes includes a capacitor portion opposed to the first capacitor electrode with the dielectric layer interposed therebetween, and a lead portion led out from the capacitor portion to at least one surface of the multilayer body and connected to the second outer electrode, and the intermediate portion is arranged in a gap area that is surrounded, when viewed in the stacking direction, by imaginary lines extending from an inner exposed end of the lead portion of the first capacitor electrode and an inner exposed end of the lead portion of the second capacitor electrode in a direction interconnecting the first surface and the second surface, by the capacitor portions of the first capacitor electrode and the second capacitor electrode, and by the first surface.

In the monolithic capacitor described above, since the intermediate portion of the first capacitor electrode is arranged in the gap area, the Young's modulus of the multilayer body is increased correspondingly. Therefore, expansion and contraction of the multilayer body caused by an electrostrictive phenomenon is significantly reduced or prevented. As a result, vibration transmitted to a circuit board is significantly reduced or prevented, and audible sounds generated from the circuit board are significantly reduced or prevented.

According to various preferred embodiments of the present invention, transmission of expansion and contraction of the multilayer body to the circuit board are significantly reduced or prevented by using only one monolithic capacitor. Therefore, the audible sounds are significantly reduced or prevented while a high degree of freedom in circuit design is ensured.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 2A and 2B illustrate a monolithic capacitor according to a first preferred embodiment of the present invention, wherein FIG. 2A is a front view, and FIG. 2B is a side view.

FIGS. 4A, 4B and 4C illustrate the monolithic capacitor according to the first preferred embodiment of the present invention, wherein FIG. 4A is a sectional view taken along a line IVA-IVA in FIG. 4B, FIG. 4B is a sectional view taken along a line IVB-IVB in FIG. 4A, and FIG. 4C is a sectional view illustrating a state where the monolithic capacitor is mounted to a circuit board.

FIG. 5 is an explanatory view illustrating a gap area in the monolithic capacitor according to the first preferred embodiment of the present invention.

FIGS. 12A and 12B are schematic explanatory views comparatively illustrating reduction of audible sounds wherein FIG. 12A represents an example of the present invention, and FIG. 12B represents an example of the related art.

DETAILED DESCRIPTION OF THE PREFERRED EMBODIMENTS

Figure 1:
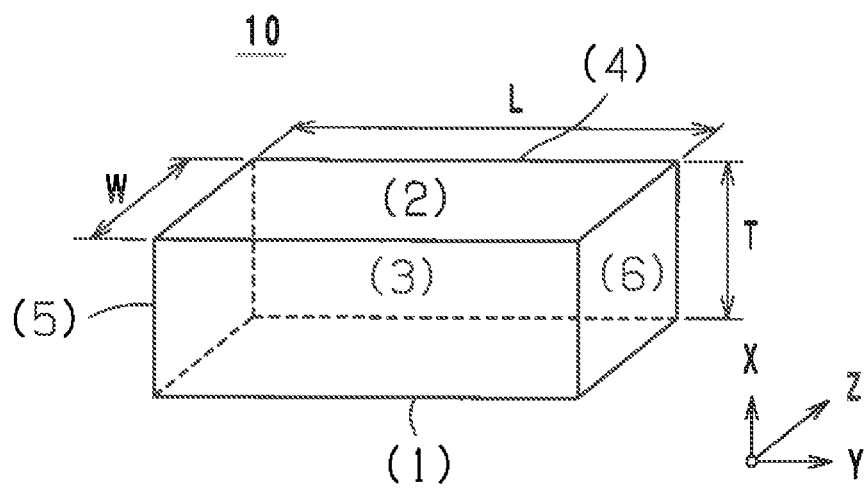
FIG. 1 is a perspective view of a multilayer body in a monolithic capacitor according to a preferred embodiment of the present invention.
Figures 2A, 2B:
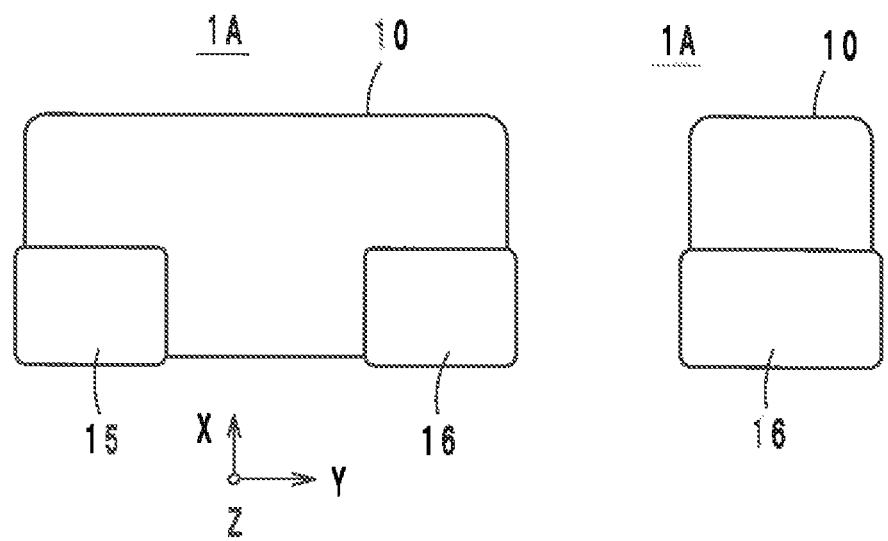
Figure 3A:
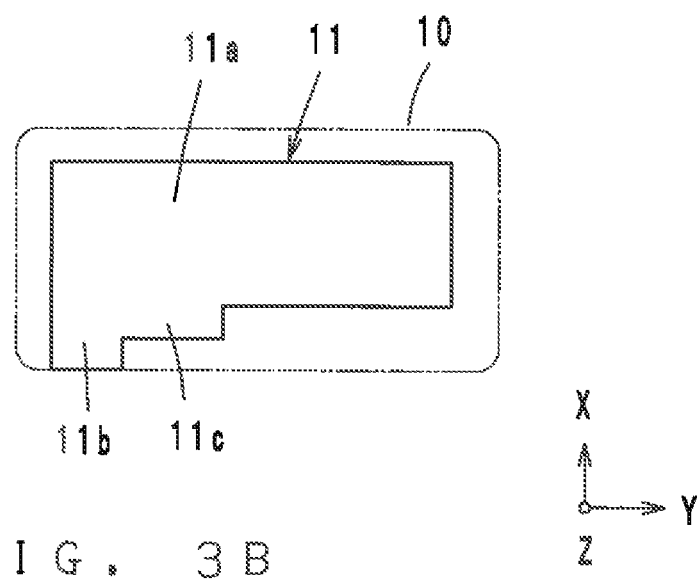
FIGS. 3A and 3B are front views of capacitor electrodes in the monolithic capacitor according to the first preferred embodiment of the present invention.
Figure 3B:
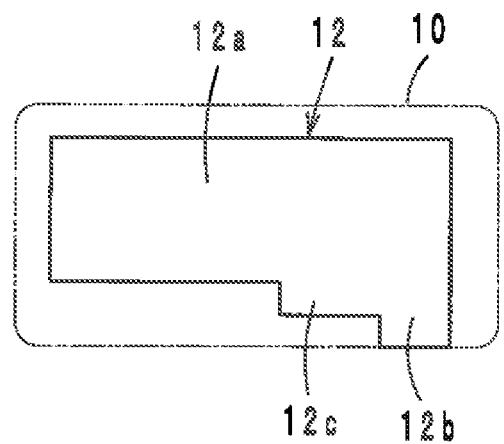

Preferred embodiments of a monolithic capacitor according to the present invention will be described below with reference to the drawings. It is to be noted that the same members and components in the drawings are denoted by common reference signs and duplicate description of those members and components are omitted.

As illustrated in FIG. 1, a multilayer body 10 constituting a monolithic capacitor preferably includes a plurality of dielectric layers stacked on each other, and the multilayer body 10 preferably has a rectangular or substantially rectangular parallelepiped shape with six surfaces. In this specification, a mount surface (lower surface) is defined as a first surface (1), and an upper surface opposed to the first surface is defined as a second surface (2). A front surface and a rear surface extending perpendicularly or substantially perpendicularly to the first surface (1) and the second surface (2) and opposed to each other are defined as a third surface (3) and a fourth surface (4), respectively. A left surface and a right surface extending perpendicularly or substantially perpendicularly to the first to fourth surface (1) to (4) and opposed to each other are defined as a fifth surface (5) and a sixth surface (6), respectively.

Furthermore, a size of the multilayer body 10 in a direction interconnecting the first surface (1) and the second surface (2) is denoted by T, a size in a direction interconnecting the third surface (3) and the fourth surface (4) is denoted by W, and a size in a direction interconnecting the fifth surface (5) and the sixth surface (6) is denoted by L. Herein, each of the above-mentioned sizes includes a thickness of an outer electrode. In addition, a height direction of the multilayer body 10 is denoted by a coordinate axis X, a length direction is denoted by a coordinate axis Y, and a stacking direction of the plural dielectric layers is denoted by a coordinate axis Z.

First Preferred Embodiment

A monolithic capacitor 1A according to a first preferred embodiment of the present invention includes plural first and second capacitor electrodes 11 and 12, which are arranged inside the multilayer body 10 in opposing relation with the dielectric layer interposed between the adjacent capacitor electrodes, and first and second outer electrodes 15 and 16. The monolithic capacitor 1A is manufactured preferably by a known stacking method. The capacitor electrodes 11 and 12 are arranged perpendicularly or substantially perpendicularly relative to the first surface and the second surface. The first outer electrode 15 is located on at least the first surface. In the illustrated example, the first outer electrode 15 is arranged over a range spanning from the first surface to a portion (lower portion) of the fifth surface. The first outer electrode 15 may be arranged to extend over the second surface as well. The second outer electrode 16 is arranged on at least the first surface. In the illustrated example, the second outer electrode 16 is arranged over a range spanning from the first surface to a portion (lower portion) of the sixth surface. The second outer electrode 16 may be arranged to extend over the second surface as well. While the first and second outer electrodes 15 and 16 are preferably arranged to extend over portions of the third surface and the fourth surfaces in the illustrated example, they may not be provided on the third surface and the fourth surface. The above-mentioned shapes of the outer electrodes 15 and 16 preferably are similarly applied to the other preferred embodiments of the present invention.

The first and second capacitor electrodes 11 and 12 include capacitor portions 11a and 12a that are opposed to each other, and lead portions 11b and 12b that are led out from the capacitor portions 11a and 12a to the first surface of the multilayer body 10. The lead portion 11b of the first capacitor electrode 11 is connected to the first outer electrode 15, and the lead portion 12b of the second capacitor electrode 12 is connected to the second outer electrode 16. An area where the capacitor portions 11a and 12a are opposed to each other with the dielectric layer interposed therebetween functions as a capacitor area CA.

The first and second capacitor electrodes 11 and 12 further include intermediate portions 11c and 12c, which are not opposed to each other, between the capacitor portion 11a and the lead portions 11b and between the capacitor portion 12a and the lead portions 12b, respectively. The intermediate portions 11c and 12c are arranged in a gap area GA denoted by hatching in FIG. 5. The gap area GA implies an area that is surrounded, when viewed in the stacking direction (i.e., the direction of the coordinate axis Z), by imaginary lines α1 and α2 extending from an inner exposed end of the lead portion 11b of the first capacitor electrode 11 and an inner exposed end of the lead portion 12b of the second capacitor electrode 12 in a direction interconnecting the first surface and the second surface, and by the capacitor portions 11a and 12a of the first and second capacitor electrodes 11 and 12. More specifically, the gap area GA implies an area surrounded by the imaginary lines α1 and α2, by edges of the capacitor portions 11a and 12a on the side closer to the first surface, and by the first surface. It is only necessary that at least one of the capacitor electrodes 11 and 12 includes the intermediate portion 11c or 12c. The intermediate portions 11c and 12c may have different shapes from each other.

The gap area GA can be specified and formed by a method described below. The monolithic capacitor 1A is polished at an LT surface thereof along the length direction L, i.e., at the third surface (3) or the fourth surface (4) in the Z-axis direction in FIG. 1, thus exposing the first capacitor electrode 11. An outer shape of the multilayer body 10 and an outer shape of the first capacitor electrode 11 are detected using an optical microscope. After further continuing the polishing to make the second capacitor electrode 12 exposed, an outer shape of the multilayer body 10 and an outer shape of the second capacitor electrode 12 are detected using the optical microscope. The outer shape of the first capacitor electrode 11 and the outer shape of the second capacitor electrode 12 are superimposed with each other such that the outer shape of the multilayer body 10 detected at the time of exposing the first capacitor electrode 11 is substantially matched with the outer shape of the multilayer body 10 detected at the time of exposing the second capacitor electrode 12. In that state, an area surrounded by the imaginary lines α1 and α2 and the capacitor portions 11a and 12a is specified as the gap area GA.

The intermediate portions 11c and 12c are also specified by superimposing the outer shape of the first capacitor electrode 11 and the outer shape of the second capacitor electrode 12 with each other similarly to the above-described manner of specifying the gap area GA, and by detecting an area where the first capacitor electrode 11 and the second capacitor electrode 12 are not opposed to each other.

In the monolithic capacitor 1A, the height size T and the width size W preferably satisfy a relationship of T>W. The length size L and the width size W preferably satisfy a relationship of L>W. Corners and ridges of the multilayer body 10 are preferably rounded. Furthermore, given that a gap size from the first surface to the capacitor portions 11a and 12a is denoted by G1 and a gap size from the second surface to the capacitor portions 11a and 12a is denoted by G2, a relationship of G1>G2 is preferably satisfied. (G1−G2) is preferably at least about 10 μm, for example.

A dielectric ceramic containing $BaTiO_3$, $CaTiO_3$, $SrTiO_3$, etc. as main components and having a high relative dielectric constant can be suitably used as the dielectric layer. The dielectric ceramic may further contain accessory components, such as a Mn compound, a Mg compound, a Si compound, a Co compound, a Ni compound, and a rare earth compound, in addition to the above-mentioned main components. A thickness of the dielectric layer in the capacitor area CA is preferably about 0.5 μm to about 10 μm, for example. The number of dielectric layers is preferably 350 or more, for example. Thus, because the monolithic capacitor has a high capacitor and tends to generate the audible sounds, various preferred embodiments of the present invention can be suitably applied to that type of monolithic capacitor.

The first and second capacitor electrodes 11 and 12 are each made of, e.g., Ni, Cu, Ag, Pd, an Ag—Pd alloy, or Au, and the electrode thickness is preferably about 0.3 μm to about 2.0 μm, for example. Ni having a higher Young's modulus is preferably used from the viewpoint of increasing the Young's modulus as described later.

The outer electrodes 15 and 16 each preferably include an underlying layer and a plating layer located on the underlying layer. The underlying layer can be suitably made of, e.g., Cu, Ni, Ag, Pd, an Ag—Pd alloy, or Au, and may be formed, for example, by baking a conductive paste. Alternatively, the underlying layer may be formed directly on the surface of the multilayer body 10 by plating. The plating layer can also be suitably made of, e.g., Cu, Ni, Ag, Pd, an Ag—Pd alloy, or Au, and it may be formed in a multilayer structure. Preferably, the plating layer has a two-layer structure made up of a Ni-plating and a Sn-plating. The outer electrodes 15 and 16 may each include a conductive resin layer.

Figure 4A:
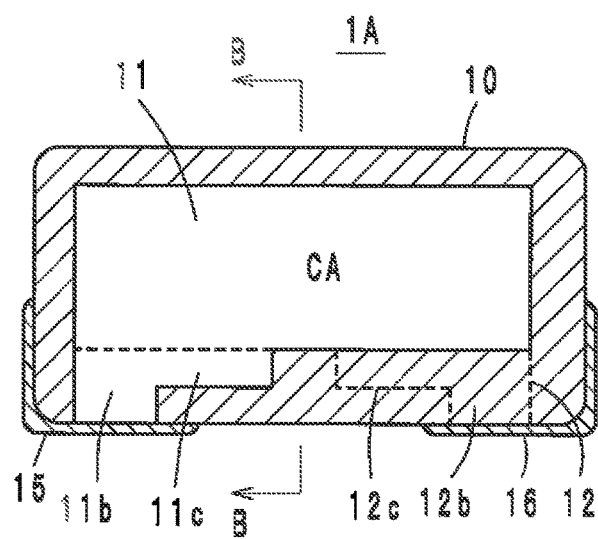
Figure 4B:
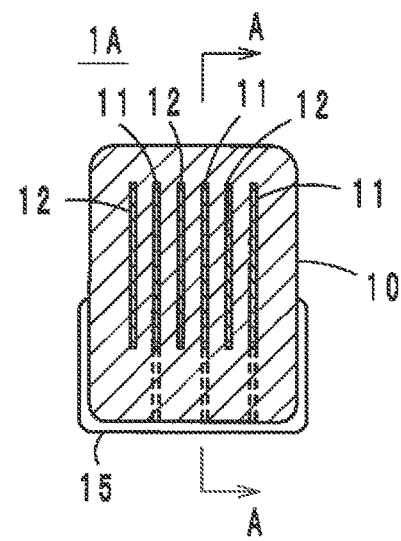
Figure 4C:
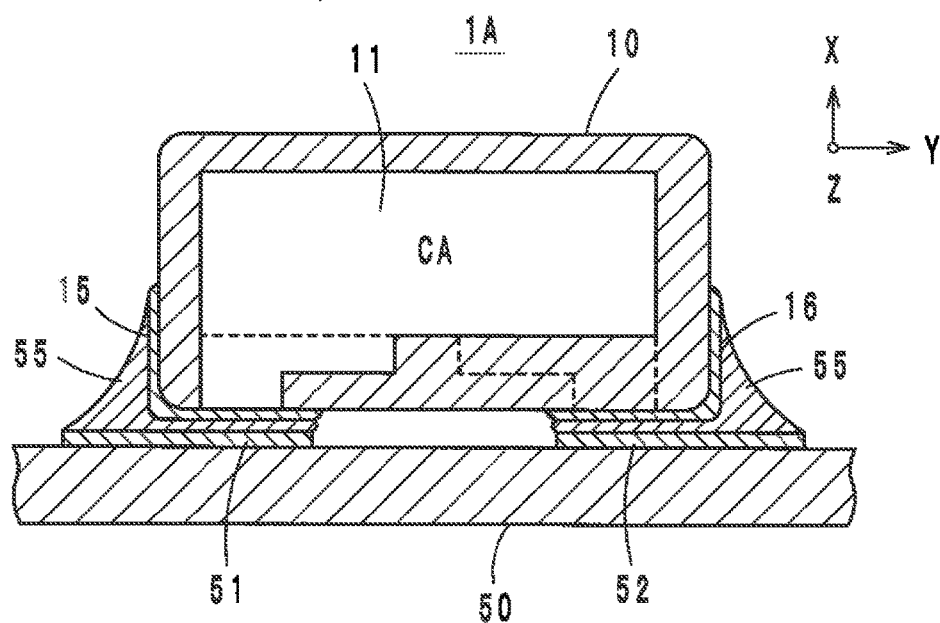

The monolithic capacitor 1A having the above-described structure is mounted on a printed circuit board 50, as illustrated in FIG. 4C. A glass epoxy board is suitably used as the printed circuit board 50, and a circuit (not illustrated) for the monolithic capacitor 1A is provided on the printed circuit board 50.

The monolithic capacitor 1A is mounted to first and second lands 51 and 52, which are located on the printed circuit board 50, through solders 55. In more detail, by heating solder pastes coated on the lands 51 and 52 in a reflow furnace, the solder pastes are molten to spread in a fluid state, such that the lands 51 and 52 are joined to the outer electrodes 15 and 16, respectively. In the illustrated case, the monolithic capacitor 1A is mounted in such an orientation that the capacitor electrodes 11 and 12 are positioned perpendicularly or substantially perpendicularly to the surface of the printed circuit board 50. A lead-free solder, e.g., a Sn—Pb eutectic solder or a Sn—Ag—Cu, can be suitably used as the solder paste. As another example, a conductive adhesive may be used instead of the solder.

In the monolithic capacitor 1A, since the intermediate portions 11c and 12c of the first capacitor electrode 11 and the second capacitor electrode 12 are arranged in the gap area GA, the Young's modulus of the multilayer body 10 is increased correspondingly. Therefore, expansion and contraction of the multilayer body 10 caused by an electrostrictive phenomenon generated in the capacitor portions 11a and 12a, which are opposed to each other, are significantly reduced or prevented. As a result, vibration transmitted to the printed circuit board 50 is significantly reduced or prevented, and the audible sounds generated from the printed circuit board 50 are significantly reduced or prevented.

Figure 12A:
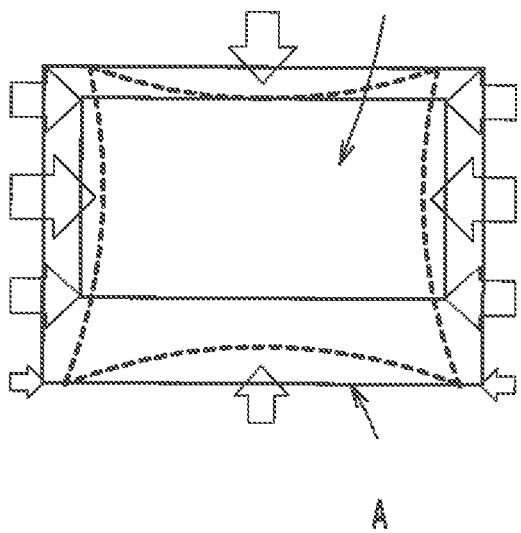
Figure 12B:
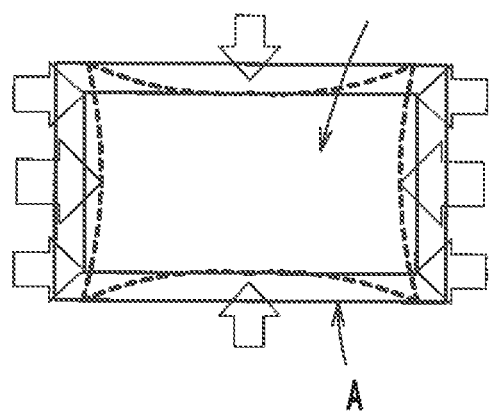

An action of significantly reducing or preventing the audible sounds is now described in detail with reference to FIGS. 12A and 12B. In the multilayer body, a portion between the first surface opposed to the printed circuit board and the capacitor portions 11a and 12a is called a lower outer portion A. Strains generated in the capacitor portions 11a and 12a distort the lower outer portion A, and strain of the lower outer portion A is finally transmitted to the circuit board as vibration of the strain. When the Young's modulus of the lower outer portion A increases, a force of restraint against deformation of the lower outer portion A is intensified and acts to significantly reduce or prevent the strain of the lower outer portion A. As a result, the strain (vibration) transmitted to the circuit board is significantly reduced or prevented, and the audible sounds generated from the circuit board are significantly reduced or prevented.

When the first capacitor electrode 11 and the second capacitor electrode 12 are made of Ni, the Young's modulus of each capacitor electrode is about 200 GPa that is twice or more the Young's modulus of a dielectric ceramic containing $BaTiO_3$ as a main component, for example. Accordingly, by increasing the layer number of intermediate portions 11c and 12c of the first capacitor electrode 11 and the second capacitor electrode 12, i.e., by increasing a thickness of the lower outer portion A, the Young's modulus of the lower outer portion A is further increased, and the strain of the lower outer portion A is further reduced or prevented. The layer number of intermediate portions 11c and 12c of the first capacitor electrode 11 and the second capacitor electrode 12 is preferably 350 or more, for example.

From the viewpoint of increasing the Young's modulus of the multilayer body 10, the intermediate portions 11*c* and 12*c* preferably occupy about 20% or more, for example, of the gap area GA when viewed in the stacking direction (i.e., the direction of the coordinate axis Z). Furthermore, the intermediate portions 11*c* and 12*c* preferably extend along the first surface of the multilayer body 10 parallel or substantially parallel to the first surface. More preferably, each of the intermediate portions 11*c* and 12*c* preferably has a rectangular or substantially rectangular shape. The areas occupied by the intermediate portions 11*c* and 12*c* can be maximized by satisfying those conditions, and the maximized areas are effective in reducing the audible sounds. In addition, since a high-frequency current flows through a path closer to the printed circuit board 50, i.e., a path along the first surface, the loop inductance is reduced.

Moreover, the gap size G1 from the first surface of the multilayer body 10 to the capacitor portions 11*a* and 12*a* is preferably greater than the gap size G2 from the second surface of the multilayer body 10 to the capacitor portions 11*a* and 12*a*. This implies that the capacitor portions 11*a* and 12*a* are positioned farther away from the printed circuit board 50. Such an arrangement is effective in reducing the audible sounds. Even when the gap size G1 is increased, an increase of the loop inductance can be held to a minimum with the provision of the intermediate portions 11*c* and 12*c*.

Preferably, the first outer electrode 15 is arranged over a region spanning from the first surface to the fifth surface of the multilayer body 10, and the second outer electrode 16 is arranged over a region spanning from the first surface to the sixth surface. By adjusting heights of the outer electrodes 15 and 16, solder fillets located on the outer electrodes 15 and 16 can be adjusted to a predetermined height. Furthermore, since the outer electrodes 15 and 16 are preferably provided only on one side (bottom side) in the height direction (i.e., the direction of the coordinate axis X), it is easy to recognize the mounting direction of the multilayer body 10.

Second Preferred Embodiment

Figure 6A:
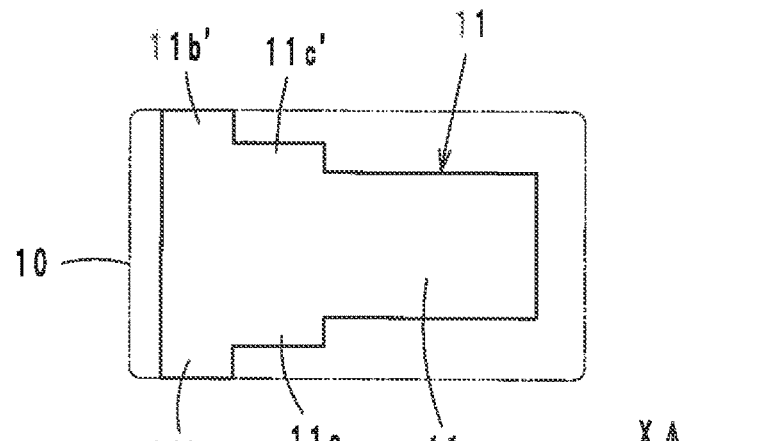
FIGS. 6A and 6B are front views of capacitor electrodes in a monolithic capacitor according to a second preferred embodiment of the present invention.
Figure 6B:
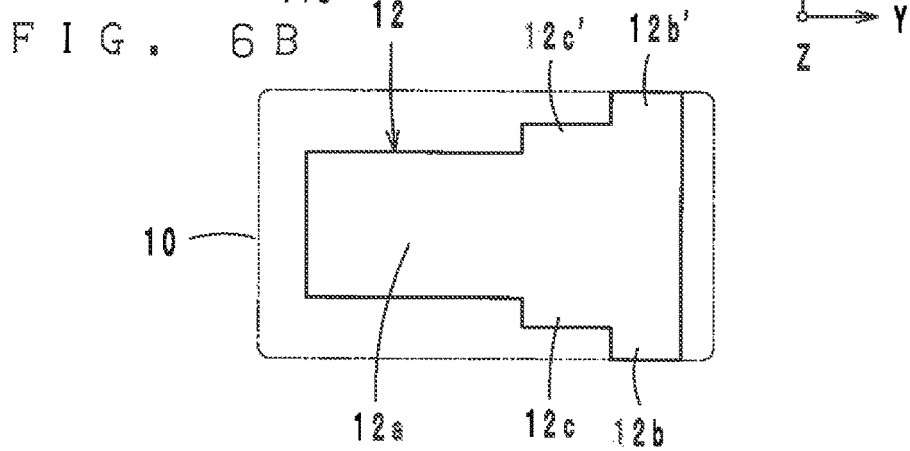
Figure 7:
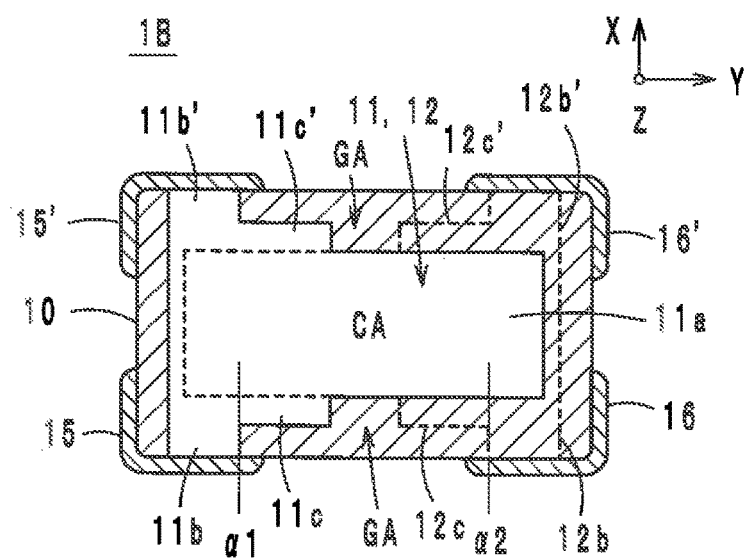
FIG. 7 is a sectional view of the monolithic capacitor according to the second preferred embodiment of the present invention.

In a monolithic capacitor 1B according to a second preferred embodiment of the present invention, as illustrated in FIGS. 6A, 6B and 7, the first and second capacitor electrodes 11 and 12 are led out to not only the first surface of the multilayer body 10 (as denoted by the lead portion 11*b* and 12*b*), but also to the second surface of the multilayer body 10 (as denoted by lead portion 11*b'* and 12*b'*). Another first outer electrode 15' is arranged over a region spanning from the second surface to the fifth surface of the multilayer body 10, and another second outer electrode 16' is arranged over a region spanning from the second surface to the sixth surface of the multilayer body 10. The outer electrodes 15' and 16' are connected to the lead portions 11*b'* and 12*b'*, respectively.

Furthermore, intermediate portions 11*c'* and 12*c'* not opposed to each other are located between the capacitor portion 11*a* and the lead portion 11*b'* and between the capacitor portion 12*a* and the lead portion 12*b'*, respectively. The other structure is preferably the same or substantially the same as that in the first preferred embodiment (monolithic capacitor 1A). Accordingly, the operating advantages of the monolithic capacitor 1B are similar to those of the monolithic capacitor 1A. In particular, when the monolithic capacitor 1B is mounted to the printed circuit board 50, it is not necessary to recognize which side of the monolithic capacitor 1B is up or down in the height direction (i.e., the direction of the coordinate axis X) of the multilayer body 10.

Third Preferred Embodiment

Figure 8A:
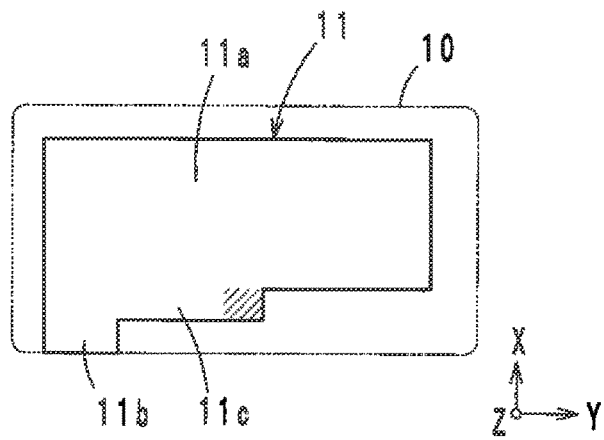
FIGS. 8A and 8B are front views of capacitor electrodes in a monolithic capacitor according to a third preferred embodiment of the present invention.
Figure 8B:
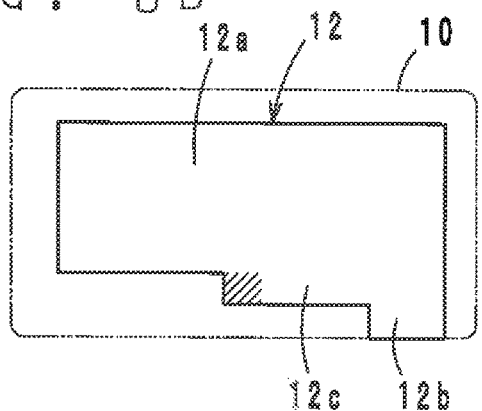
Figure 9:
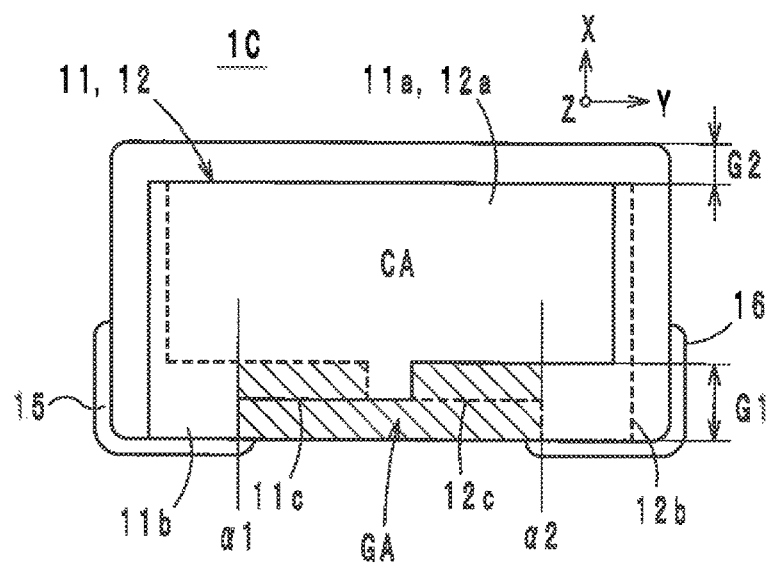
FIG. 9 is an explanatory view illustrating a gap area in the monolithic capacitor according to the third preferred embodiment of the present invention.

In a monolithic capacitor 1C according to a third preferred embodiment of the present invention, as illustrated in FIGS. 8A, 8B and 9, the intermediate portions 11*c* and 12*c* of the first and second capacitor electrodes 11 and 12 are arranged to extend parallel or substantially parallel to the first surface to such an extent so as to provide portions (denoted by hatching in FIGS. 8A and 8B) that are overlapped with each other in the stacking direction. Those portions of the intermediate portions 11*c* and 12*c* overlapped with each other in the stacking direction function as and define portions of the capacitor portions 11*a* and 12*a*, i.e., as a portion of the capacitor area CA. In the third preferred embodiment, the gap area GA preferably includes a partially-recessed rectangular portion as denoted by hatching in FIG. 9.

The other structure of the third preferred embodiment preferably is basically the same or substantially the same as that of the first preferred embodiment. Accordingly, the third preferred embodiment also has similar operating advantages to those of the first preferred embodiment. In particular, since the intermediate portions 11*c* and 12*c* preferably have enlarged shapes, the Young's modulus of the multilayer body 10 is increased correspondingly, and the audible sounds generated from the printed circuit board are further reduced or prevented.

Fourth Preferred Embodiment

Figure 10A:
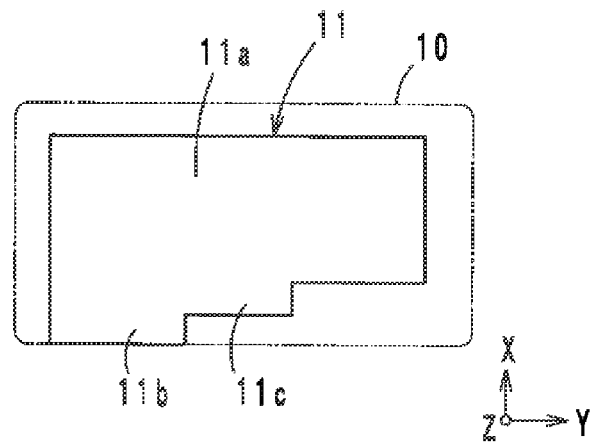
FIGS. 10A and 10B are front views of capacitor electrodes in a monolithic capacitor according to a fourth preferred embodiment of the present invention.
Figure 10B:
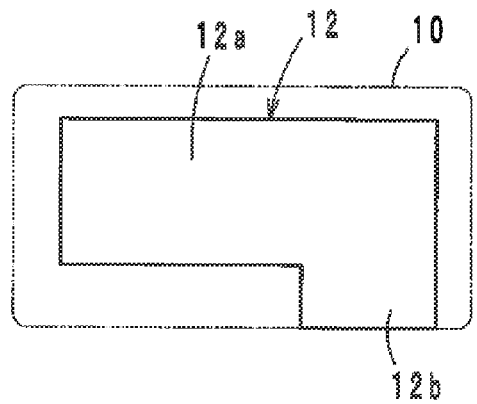
Figure 11:
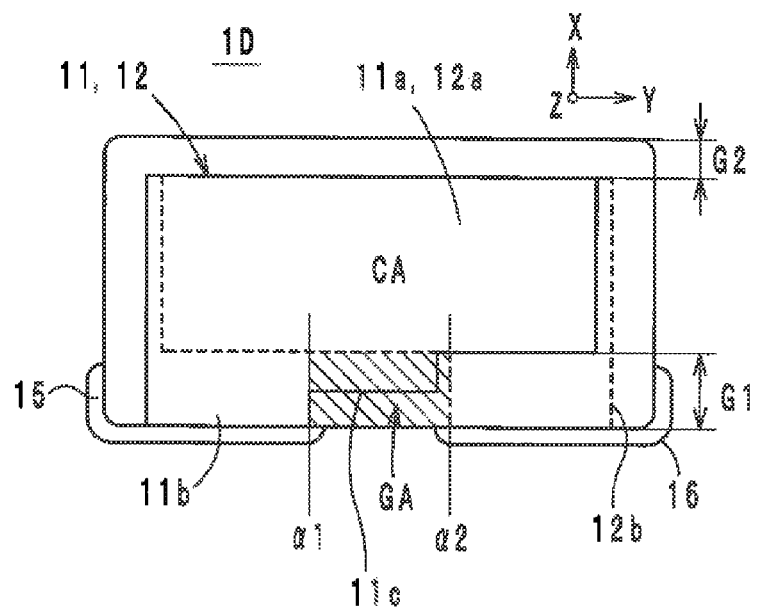
FIG. 11 is an explanatory view illustrating a gap area in the monolithic capacitor according to the fourth preferred embodiment of the present invention.

In a monolithic capacitor 1D according to a fourth preferred embodiment of the present invention, as illustrated in FIGS. 10A, 10B and 11, width sizes (i.e., sizes in the direction of the coordinate axis Y) of the lead portions 11*b* and 12*b* of the first and second capacitor electrodes 11 and 12 are set to be comparatively large, and only the first capacitor electrode includes the intermediate portion 11*c*. In the fourth preferred embodiment, the gap area GA is a comparatively small area as denoted by hatching in FIG. 11. Furthermore, heights (top positions in the direction of the coordinate axis X) of the first and second outer electrodes 15 and 16 are preferably set to be lower than a lower edge of the capacitor area CA.

The other structure of the fourth preferred embodiment preferably is basically the same or substantially the same as that of the first preferred embodiment. Accordingly, the fourth preferred embodiment also has similar operating advantages to those of the first preferred embodiment. In particular, since the lead portions 11*b* and 12*b* preferably have enlarged shapes, the Young's modulus of the multilayer body 10 is increased correspondingly, and the audible sounds generated from the printed circuit board are further reduced or prevented. In addition, since the heights of the outer electrodes 15 and 16 are preferably set to be lower than the lower edge of the capacitor area CA, the outer electrodes 15 and 16 and the solder fillets are positioned farther away from the capacitor area CA where large expansion and contraction occur upon application of a voltage. As a result, transmission of vibration is significantly reduced or prevented, and the audible sounds generated from the printed circuit board are significantly reduced or prevented.

Other Preferred Embodiments

It is to be noted that the monolithic capacitor according to the present invention is not limited to the above-described preferred embodiments, and that the present invention can be variously modified without departing from the scope of the present invention.

In particular, details in shapes of the multilayer body and the capacitor electrodes can be optionally selected. The capacitor of the capacitor can also be optionally selected. It is, however, known that a capacitor having a capacitance of about 1 μF or more causes acoustic noise. In the first preferred embodiment, the capacitor electrodes 11 and 12 may be further connected to the outer electrodes 15 and 16 at the fifth surface and the sixth surface of the multilayer body 10, respectively.

As seen from the above description, preferred embodiments of the present invention are useful for a monolithic capacitor. In particular, preferred embodiments of the present invention is excellent in that the audible sounds are significantly reduced or prevented while a high degree of freedom in circuit design is ensured.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A monolithic capacitor comprising:
   a multilayer body including a plurality of dielectric layers and six surfaces, the six surfaces including a first surface defining a mount surface, a second surface opposed to the first surface, a third surface and a fourth surface extending perpendicularly or substantially perpendicularly to the first surface and the second surface and perpendicularly or substantially perpendicularly to a stacking direction of the dielectric layers, and opposed to each other, and a fifth surface and a sixth surface extending perpendicularly or substantially perpendicularly to the first to fourth surfaces and opposed to each other;
   a plurality of first capacitor electrodes and second capacitor electrodes arranged inside the multilayer body; and
   a first outer electrode and a second outer electrode arranged on at least one surface of the multilayer body; wherein
   the first capacitor electrodes and the second capacitor electrodes are arranged perpendicularly or substantially perpendicularly to the first surface and the second surface;
   each of the first capacitor electrodes includes a capacitor portion opposed to the second capacitor electrode with the dielectric layer interposed therebetween, a lead portion led out from the capacitor portion to at least one surface of the multilayer body and connected to the first outer electrode, and an intermediate portion connected to the capacitor portion and to the lead portion and not opposed to the second capacitor electrodes;
   each of the second capacitor electrodes includes a capacitor portion opposed to the first capacitor electrode with the dielectric layer interposed therebetween, and a lead portion led out from the capacitor portion to at least one surface of the multilayer body and connected to the second outer electrode, and an intermediate portion connected to the capacitor portion and to the lead portion and not opposed to the first capacitor electrodes;
   the intermediate portion of each of the first capacitor electrodes and the intermediate portion of each of the second capacitor electrodes extend along the first surface of the multilayer body parallel or substantially parallel to the first surface;
   the intermediate portion of each of the first capacitor electrodes and the intermediate portion of each of the second capacitor electrodes do not overlap each other;
   the first capacitor electrodes and the second capacitor electrodes are led out to the first surface and are not led out to the second surface;
   the intermediate portion of each of the first capacitor electrodes and the intermediate portion of each of the second capacitor electrodes are arranged in a gap area that is surrounded, when viewed in the stacking direction, by imaginary lines extending from an inner exposed end of the lead portion of each of the first capacitor electrodes and an inner exposed end of the lead portion of each of the second capacitor electrodes in a direction interconnecting the first surface and the second surface, by the capacitor portions of each of the first capacitor electrodes and the second capacitor electrodes, and by the first surface; and
   when each of the first and second capacitor electrodes is viewed in the stacking direction, a dimension of the intermediate portion of each of the first capacitor electrodes or each of the second capacitor electrodes in a direction parallel to the first surface is greater than a dimension of the lead portion in the direction parallel to the first surface.

2. The monolithic capacitor according to claim 1, wherein the intermediate portion of each of the first capacitor electrodes or each of the second capacitor electrodes occupies about 20% or more of the gap area when viewed in the stacking direction.

3. The monolithic capacitor according to claim 1, wherein a gap size from the first surface of the multilayer body to the capacitor portion is denoted by G1 and a gap size from the second surface of the multilayer body to the capacitor portion is denoted by G2, and G1>G2 is satisfied.

4. The monolithic capacitor according to claim 1, wherein in the multilayer body, a size in a direction interconnecting the first surface and the second surface is denoted by T, a size in a direction interconnecting the third surface and the fourth surface is denoted by W, a size in a direction interconnecting the fifth surface and the sixth surface is denoted by L, and T>W is satisfied.

5. The monolithic capacitor according to claim 1, wherein the first outer electrode extends over a region spanning from the first surface to the fifth surface of the multilayer body, and the second outer electrode extends over a region spanning from the first surface to the sixth surface of the multilayer body.

6. The monolithic capacitor according to claim 1, wherein the multilayer body has a rectangular or substantially rectangular parallelepiped shape.

7. The monolithic capacitor according to claim 1, wherein the first outer electrode is located on at least the first surface and is arranged over a range spanning from the first surface to a portion of the fifth surface.

8. The monolithic capacitor according to claim 7, wherein the first outer electrode is arranged to also extend over the second surface.

9. The monolithic capacitor according to claim 7, wherein the first outer electrode and the second outer electrode are arranged to extend over the third surface and the fourth surface.

10. The monolithic capacitor according to claim 1, wherein the second outer electrode is located on at least the first surface and is arranged over a range spanning from the first surface to a portion of the sixth surface.

11. The monolithic capacitor according to claim 10, wherein the second outer electrode is arranged to also extend over the second surface.

12. The monolithic capacitor according to claim 1, wherein the intermediate portion of each of the first capacitor electrodes and the intermediate portion of each of the second capacitor electrodes have different shapes from each other.

13. The monolithic capacitor according to claim 1, wherein each of the first outer electrode and the second outer electrode include an underlying layer and a plating layer located on the underlying layer.

14. The monolithic capacitor according to claim 1, further comprising another first outer electrode arranged over a region spanning from the second surface to the fifth surface of the multilayer body, and another second outer electrode arranged over a region spanning from the second surface to the sixth surface of the multilayer body.

15. The monolithic capacitor according to claim 1, wherein the intermediate portions of the first and second capacitor electrodes are located between the capacitor portion and the lead portion of the first capacitor electrodes and between the capacitor portion and the lead portion of the second capacitor electrodes.

* * * * *